(12) United States Patent
Gluck (10) Patent No.: US 7,556,425 B2
(45) Date of Patent: Jul. 7, 2009

(54) DUAL-WALL CONTAINER WITH HEAT ACTIVATED AND/OR TEMPERATURE-CHANGE ACTIVATED COLOR CHANGING CAPABILITY

(75) Inventor: J. Robert Gluck, Lawrence, NY (US)

(73) Assignee: Robert Gordon Industries, Ltd., Lynbrook, NY (US)

( * ) Notice: Subject to any disclaimer, the term of this patent is extended or adjusted under 35 U.S.C. 154(b) by 234 days.

(21) Appl. No.: 11/548,194

(22) Filed: Oct. 10, 2006

(65) Prior Publication Data

US 2008/0084915 A1 Apr. 10, 2008

(51) Int. Cl.
*G01K 11/12* (2006.01)
*G01K 11/18* (2006.01)

(52) U.S. Cl. ............... 374/162; 374/17; 374/159; 374/161; 374/E11.018; 374/E11.023

(58) Field of Classification Search ............ 374/16, 374/17, 161–162, 208, E11.018, E11.023, 374/E11.024; 116/216; D9/516–575
See application file for complete search history.

(56) References Cited

U.S. PATENT DOCUMENTS

| | | | | |
|---|---|---|---|---|
| 2,308,087 A | * | 1/1943 | Lappala | 116/216 |
| 4,016,762 A | | 4/1977 | Payne | |
| 4,156,365 A | * | 5/1979 | Heinmets et al. | 374/162 |
| 4,554,565 A | * | 11/1985 | Kito et al. | 503/201 |
| 4,863,282 A | | 9/1989 | Rickson | |
| 4,919,983 A | | 4/1990 | Fremin | |
| 5,323,652 A | | 6/1994 | Parker | |
| 5,400,610 A | * | 3/1995 | Macedo | 62/130 |
| 5,447,248 A | * | 9/1995 | Rodriguez et al. | 215/366 |
| 5,720,555 A | * | 2/1998 | Elele | 374/150 |
| 5,788,369 A | | 8/1998 | Tseng | |
| 5,950,917 A | | 9/1999 | Smith | |
| 6,008,269 A | | 12/1999 | Kitagawa et al. | |
| 6,260,414 B1 | | 7/2001 | Brown et al. | |
| 6,264,049 B1 | | 7/2001 | Shteynberg | |
| 6,283,627 B1 | | 9/2001 | Fromm | |
| 6,386,756 B1 | * | 5/2002 | Rice | 374/157 |
| 6,494,950 B1 | * | 12/2002 | Fujita et al. | 106/499 |
| 6,511,031 B2 | | 1/2003 | Lin | |
| 6,513,379 B2 | | 2/2003 | Meyers et al. | |

(Continued)

OTHER PUBLICATIONS

*Chromatic Properties of Thermochromatic Ink* by L. Johansson.

Primary Examiner—Patrick J Assouad
Assistant Examiner—Bret Adams
(74) Attorney, Agent, or Firm—Greemblum & Bernstein, P.L.C.

(57) ABSTRACT

Dual-wall container includes an outer wall that is at least one of at least partially substantially transparent and at least partially substantially translucent, an inner wall adapted to contain a substance, at least one symbol arranged an outer surface of the inner wall, and at least one of a coating of a thermochromatic composition arranged on the outer surface of the inner wall, a thermochromatic composition layer arranged on the outer surface of the inner wall, and a thermochromatic composition arranged on an outer surface of at least the at least one symbol. The thermochromatic composition is structured and arranged to change color when the inner wall experiences or senses a temperature change. This Abstract is not intended to define the invention disclosed in the specification, nor intended to limit the scope of the invention in any way.

34 Claims, 12 Drawing Sheets

U.S. PATENT DOCUMENTS

| | | |
|---|---|---|
| 6,554,448 B2 * | 4/2003 | Carpenter et al. ............ 362/161 |
| 6,579,006 B1 * | 6/2003 | Pariseau ..................... 374/162 |
| 6,594,927 B2 * | 7/2003 | Witkowski ................... 40/310 |
| 6,863,720 B2 | 3/2005 | Kitagawa et al. |
| 6,880,396 B2 | 4/2005 | Rait |
| 6,921,179 B2 | 7/2005 | Diak Ghanem |
| 6,929,136 B2 | 8/2005 | Salazar-Leal |
| 6,979,120 B1 * | 12/2005 | Wolfe ......................... 374/162 |
| 2002/0030030 A1 | 3/2002 | Rees |
| 2002/0097777 A1 | 7/2002 | Ronci |
| 2002/0097778 A1 | 7/2002 | Moroskat et al. |
| 2003/0000451 A1 | 1/2003 | Wilcox |
| 2005/0178773 A1 | 8/2005 | Sena et al. |
| 2005/0242103 A1 | 11/2005 | Thomas et al. |
| 2006/0102582 A1 * | 5/2006 | Wakefield et al. ........... 215/12.1 |
| 2006/0130733 A1 * | 6/2006 | Linke et al. .................. 116/216 |
| 2007/0053406 A1 * | 3/2007 | LaGuardia et al. ........... 374/161 |
| 2008/0110391 A1 * | 5/2008 | Taylor et al. ................. 116/216 |
| 2008/0142529 A1 * | 6/2008 | LaGuardia et al. ........ 220/592.2 |

* cited by examiner

DUAL-WALL CONTAINER WITH HEAT ACTIVATED AND/OR TEMPERATURE-CHANGE ACTIVATED COLOR CHANGING CAPABILITY

BACKGROUND OF THE INVENTION

1. Field of the Invention

The invention relates to a dual-wall container having a color changing capability. The invention also relates to a dual wall container that includes an outer wall which is at least partially substantially transparent and/or translucent and an inner wall that includes at least one symbol covered by a coating and/or a layer of a thermochromatic composition. When the inner wall experiences or senses a temperature change, e.g., heating above ambient or cooling below ambient, the thermochromatic composition reacts by changing color, e.g., by becoming substantially colorless, substantially transparent, or substantially translucent, thereby increasing the contrast between the at least one symbol and the inner wall. This, in turn, renders the at least one symbol substantially more visible through the outer wall. The invention also relates to a method of making the container.

2. Discussion of Background Information

Containers utilizing dual-walls and/or color changing capabilities are known. US 2005/0242103, for example, discloses a drinking cup includes an inner wall with an outer surface and an inner surface. The inner wall includes a thermo-chromatic substance that exhibits a color variance corresponding to a temperature variance in a beverage in the cup that is in contact with the inner wall. An outer wall is disposed about the inner wall that has a transparent area adapted to permit a visual perception of at least a portion of the color variance of the thermo-chromatic substance in or on the inner wall through the outer wall. A thermal insulation layer is disposed between the inner wall and the outer wall (see Abstract). U.S. Pat. No. 6,921,179 discloses a drinking vessel is provided with an insulated wall structure including an inner wall, an outer wall, and a void between the inner and outer walls providing an insulative barrier for maintaining the temperature of the liquid contents within a desired range for extended periods of time, while also preventing the formation of condensation on the outside of the vessel. Luminescent elements, such as shapes, letters, numbers or designs, are applied to the insulated wall structure to enhance visibility of the drinking vessel and the level of liquid beverage contents when in dark or low light conditions. In an alternative embodiment, the luminescent material is incorporated into the composition of the wall structure during the molding process. A removable lid may be provided for covering the open top of the drinking vessel. In one embodiment, the drinking vessel and removable top lid are structured and disposed to provide a child's sip cup, wherein the lid includes an integrated sip spout and valve for resisting spills (see Abstract).

However, such containers do not utilize the unique combination of features of the instant invention. In particular, they do not utilize e.g., a dual-wall container having an outer wall which is at least partially substantially transparent and/or translucent and an inner wall that includes at least one symbol covered by a coating and/or a layer of a thermochromatic composition, wherein, when the inner wall experiences or senses a temperature change, e.g., heating above ambient, the thermochromatic composition reacts by changing color, e.g., by becoming substantially colorless, transparent or translucent, thereby increasing the contrast between the at least one symbol and the inner wall, and whereby the at least one symbol is rendered substantially more visible through the outer wall.

SUMMARY OF THE INVENTION

According to one illustrative aspect of the invention, a dual-wall container including an outer wall that is at least one of at least partially substantially transparent and at least partially substantially translucent, an inner wall adapted to contain a substance, at least one symbol arranged an outer surface of the inner wall, and at least one of a coating of a thermochromatic composition arranged on the outer surface of the inner wall, a thermochromatic composition layer arranged on the outer surface of the inner wall, and a thermochromatic composition arranged on an outer surface of at least the at least one symbol. The thermochromatic composition is structured and arranged to change color when the inner wall experiences or senses a temperature change.

The substance may be a liquid having a temperature above ambient or room temperature. The substance may be a liquid having a temperature below ambient or room temperature. When the inner wall experiences or senses a temperature change, the thermochromatic composition may become at least one of substantially colorless, substantially transparent, and substantially translucent. When the inner wall experiences or senses a temperature change, a contrast between the at least one symbol and the inner wall may increase thereby rendering the at least one symbol substantially more visible through the outer wall. The outer wall may comprise a synthetic resin and the inner wall may comprise a metal. The outer wall may comprise a synthetic resin and the inner wall may comprise a synthetic resin. The outer wall may comprise a synthetic resin and the inner wall may comprise stainless steel. The outer wall may comprise PVC and the inner wall may comprise 18-8 stainless steel. The container may further comprise a cap arranged to cover an opening of the dual-wall container.

The at least one symbol may comprise at least one of a depiction of an object, one or more geometric shapes, one or more trademarks, one or more numbers, and one or more letters. The at least one symbol may be printed on the outer surface of the inner wall. The at least one symbol may be printed on a clear film and the film may be at least one of position on the outer surface of the inner wall and secured to the outer surface of the inner wall. The at least one symbol may be printed on a first liner, the thermochromatic composition may be arranged on a second liner, and the second liner may be arranged over the first liner. The at least one symbol may be printed on the outer surface of the inner wall and the thermochromatic composition is printed on the at least one symbol. The at least one symbol may be a self-adhesive imprinted label that is attached to the outer surface of the inner wall. The at least one symbol may be a water decal that is positioned on the outer surface of the inner wall. The at least one symbol may be printed on the outer surface of the inner wall.

The thermochromatic composition may comprise a chromicolor ink. The thermochromatic composition may comprise a thermochromatic ink. The thermochromatic composition may be applied by silkscreening. The thermochromatic composition may be at least one of arranged to cover the at least one symbol and applied over the at least one symbol. The thermochromatic composition may be at least one of arranged to cover the at least one symbol and substantially all of the outer surface of the inner wall and applied over the at least one symbol and substantially all of the outer surface of the inner wall.

The invention also provides for a method of making a dual-wall container comprising an outer wall that is at least one of at least partially substantially transparent and at least partially substantially translucent, an inner wall adapted to contain a substance, at least one symbol arranged an outer surface of the inner wall, wherein the method comprises arranging the at least one symbol on the outer surface of the inner wall and at least one of applying a coating of a thermochromatic composition on the outer surface of the inner wall and arranging a thermochromatic composition layer to the outer surface of the inner wall.

The at least one symbol may comprise at least one of a depiction of an object, one or more geometric shapes, one or more trademarks, one or more numbers, and one or more letters. The arranging may comprise printing the at least one symbol on the outer surface of the inner wall. The arranging may comprise printing the at least one symbol on a clear film and further comprising at least one of positioning the film on the outer surface of the inner wall and securing the film to the outer surface of the inner wall. The arranging may comprise printing the at least one symbol on a first liner, and wherein the thermochromatic composition is placed on a second liner, and further comprising arranging the second liner over the first liner. The arranging may comprise printing the at least one symbol on the outer surface of the inner wall and wherein the thermochromatic composition is printed on the at least one symbol.

The at least one symbol may be a self-adhesive imprinted label and wherein the placing comprises attaching the self-adhesive imprinted label to the outer surface of the inner wall. The at least one symbol may be a water decal and wherein the placing comprises positioned the water decal on the outer surface of the inner wall. The arranging may comprise printing the at least one symbol on the outer surface of the inner wall. The arranging may comprise printing the at least one symbol with a non-thermochromatic ink on the outer surface of the inner wall.

The thermochromatic composition may comprise a chromicolor ink. The thermochromatic composition may comprise a thermochromatic ink. The thermochromatic composition may be applied by silkscreening. The thermochromatic composition may be at least one of arranged to cover the at least one symbol and applied over the at least one symbol. The thermochromatic composition may be at least one of covering the at least one symbol and substantially all of the outer surface of the inner wall and applied over the at least one symbol and substantially all of the outer surface of the inner wall. The thermochromatic composition may be applied only over the at least one symbol.

The invention also provides for a dual-wall container comprising a synthetic resin outer wall that is at least one of at least partially substantially transparent and at least partially substantially translucent, a stainless steel inner wall adapted to contain a substance, at least one symbol arranged an outer surface of the inner wall, and at least one of a coating of a thermochromatic composition arranged on the outer surface of the inner wall, a thermochromatic composition layer arranged on the outer surface of the inner wall, and a thermochromatic composition arranged on an outer surface of at least the at least one symbol. The thermochromatic composition may be structured and arranged to change color when the inner wall experiences or senses a temperature change.

The invention also provides for a method of using the dual-wall container of the type described above, wherein the method comprises placing a sufficient amount of the substance in the dual-wall container in order to cause the thermochromatic composition to change color and thereby one of render the at least one symbol significantly more visible through the outer wall than prior to the placing, change a color of the outer surface of the inner wall not covered by the at least one symbol so that the at least one symbol visually stands out more relative to the outer surface of the inner wall, and increase a color contrast between the outer surface of the inner wall not covered by the at least one symbol and the at least one symbol, wherein the substance comprises a temperature that is one of above room temperature and below room temperature.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

FIGS. 1-10 show a first non-limiting embodiment of a dual-wall container 1. The container 1 includes an outer wall 2, an inner wall 3 and an optional cap 4. The container 1 is generally sized and shaped to contain a substance (not shown) such as a liquid or solid. By way of non-limiting example, the container 1 is sized to contain a volume of the substance that is between approximately ½ pint and a quart and is preferably a portable container. Although the container 1 is shown to have an ergonomic shape, it can also have any other desired size and shape and can preferably be of a size and shape of conventional mugs, tumblers, etc. By way of non-limiting example, the container 1 can have an overall height (measured to the rim and with the cap 4 removed) of about 8 inches and a maximum diameter of about 3 inches. Although not shown, the container may utilize one or more handles.

Figure 1:
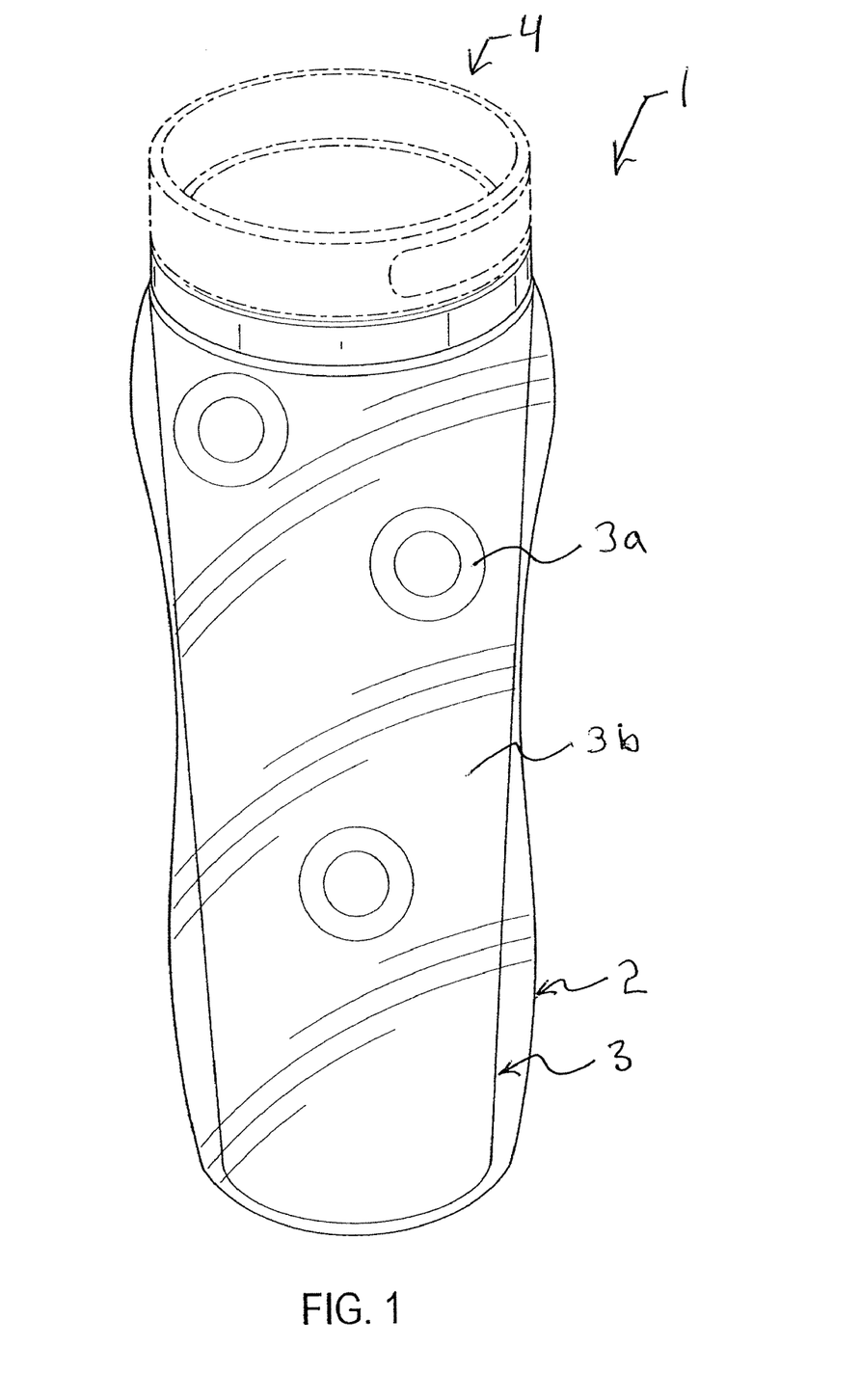
FIG. 1 shows a front side perspective view of one embodiment of a dual-wall container after the container is filled with a substance that is either above or below room temperature so as to render the symbols visible.
Figure 2:
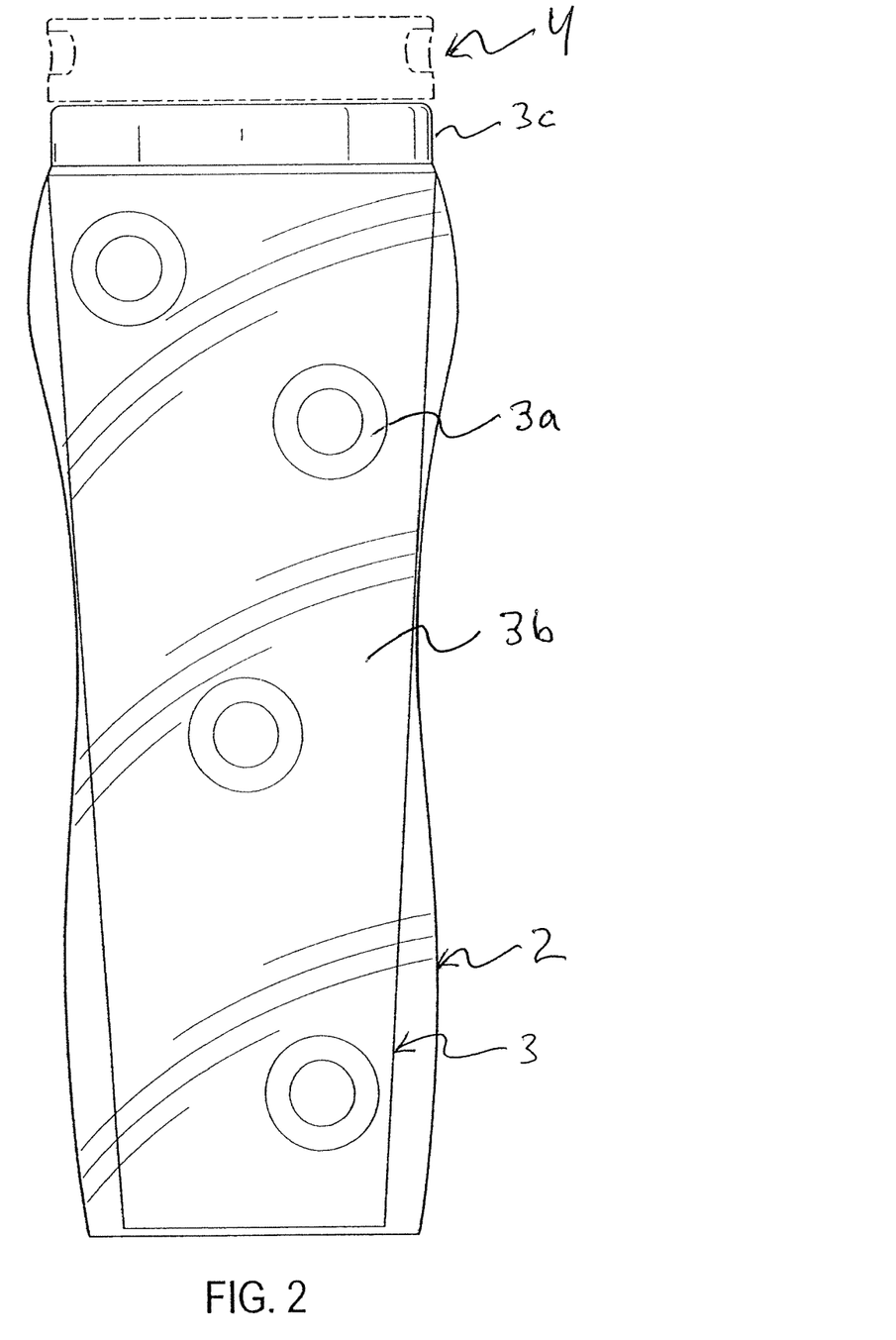
FIG. 2 shows a side view of the embodiment shown in FIG. 1.
Figure 3:
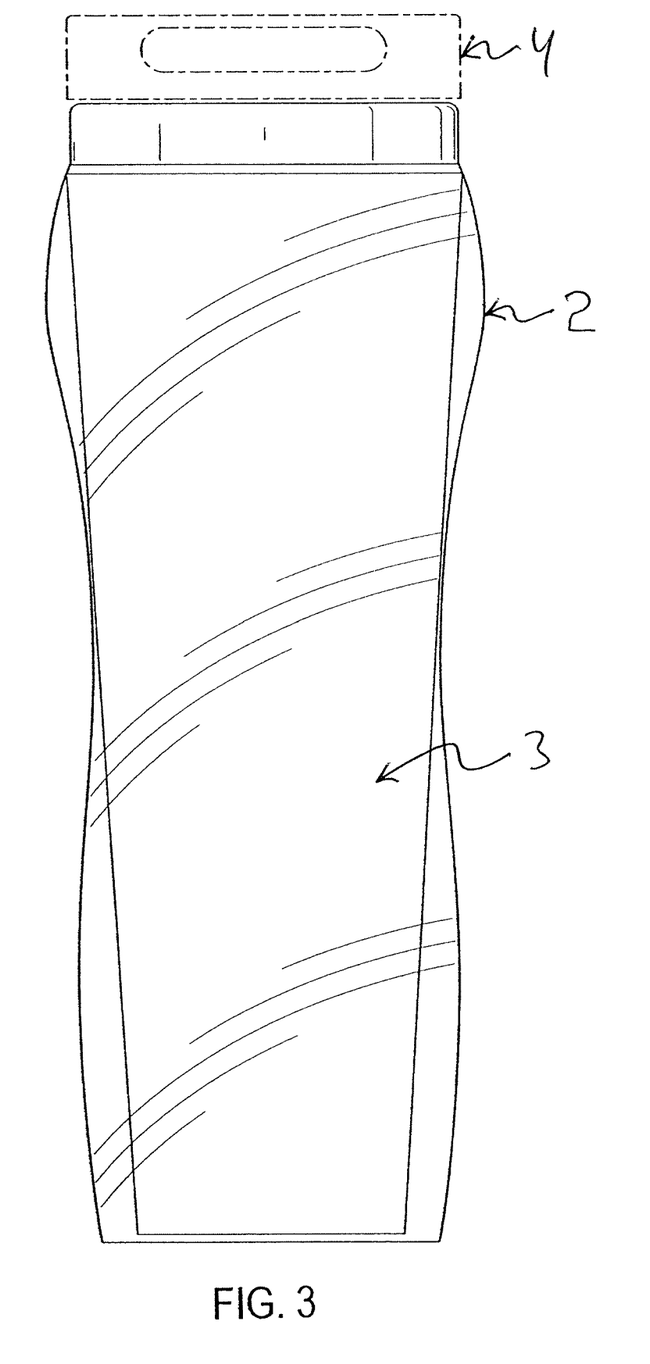
FIG. 3 shows a side view of the embodiment of FIG. 1 before the heated or cooled substance is placed inside the container. As a result, the symbols are not readily or easily visible through the outer wall.
Figure 6:
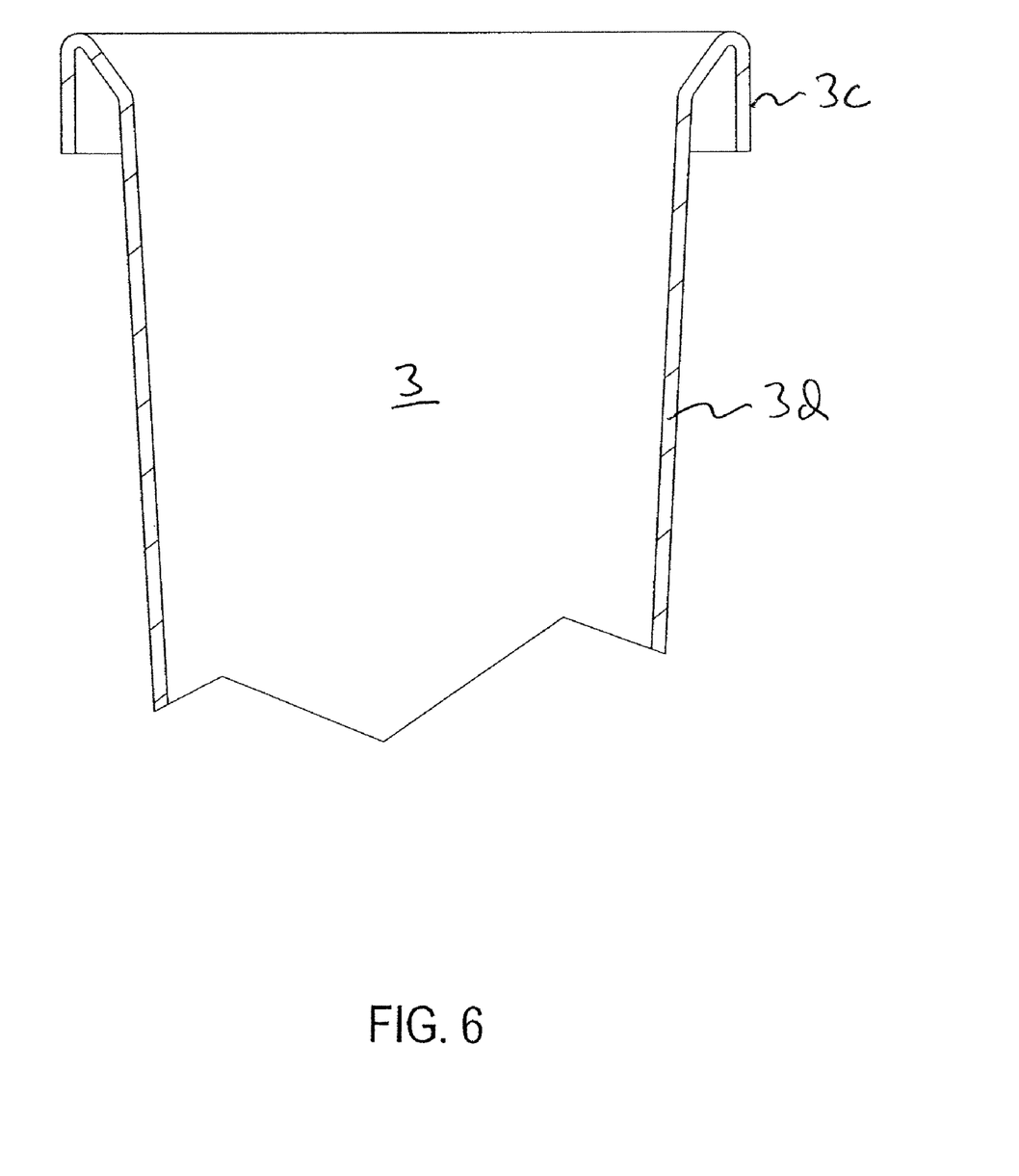
FIG. 6 shows a partial cross-section view of the inner wall used in the embodiment shown in FIG. 1.
Figure 8:
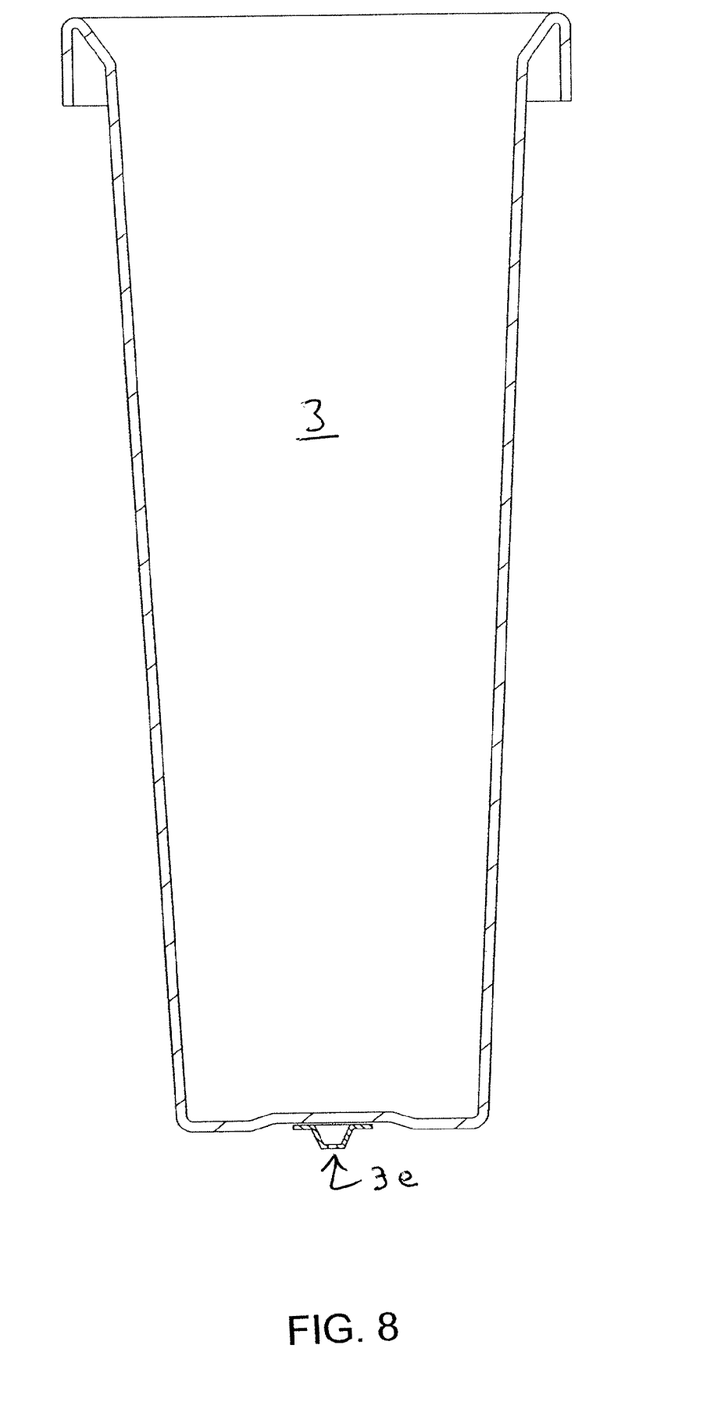
FIG. 8 shows a front side cross-section view of the complete innerwall and shows one non-limiting mechanism for connecting the bottom of the inner wall to a bottom of the outer wall.

The inner wall 3 forms the container for the substance and includes a closed bottom, an open top and a generally tapered side wall 3d. Of course, the inner wall 3 can any desired shape. By way of non-limiting example, the inner wall 3 can be made of a synthetic resin material such as e.g., PVC. Preferably, the inner wall 3 is made of a metal which can be easily cleaned and/or sterilized and which is a good conductor of heat. By way of non-limiting example, the inner wall 3 can be made of e.g., 18-8 stainless steel. By way of non-limiting example, the inner wall 3 can be a one-piece member that is made by deforming stainless steel sheet metal in a die. The thickness of the wall 3d can be any desired value. Also by way of non-limiting example, the upper portion 3c of the inner wall 3 can be bent over to form a rim.

Figure 4:
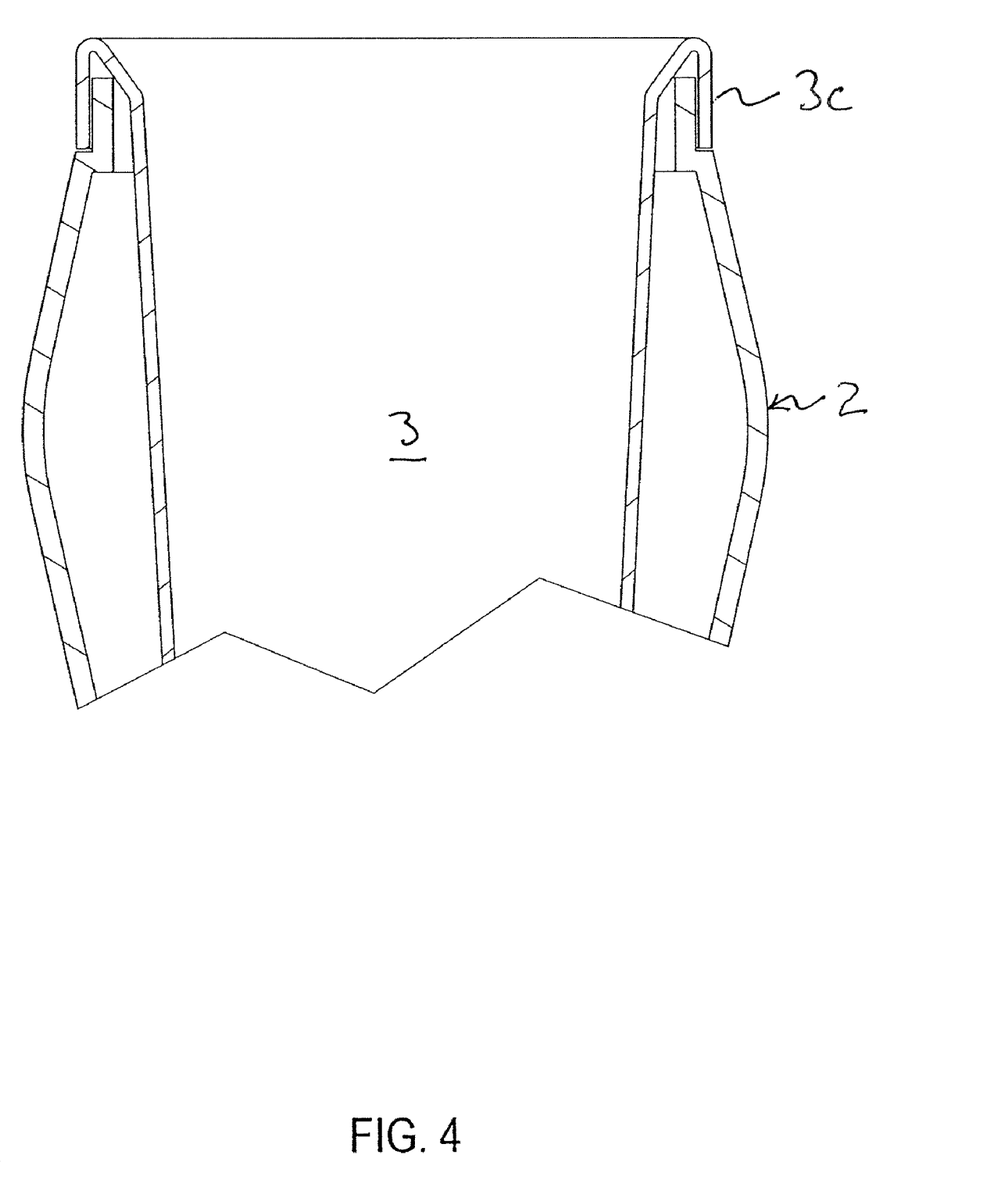
FIG. 4 shows a cross-section view of one non-limiting way in which the inner wall is coupled to the outer wall of the embodiment shown in FIG. 1 so as to form the rim of the container.
Figure 5:
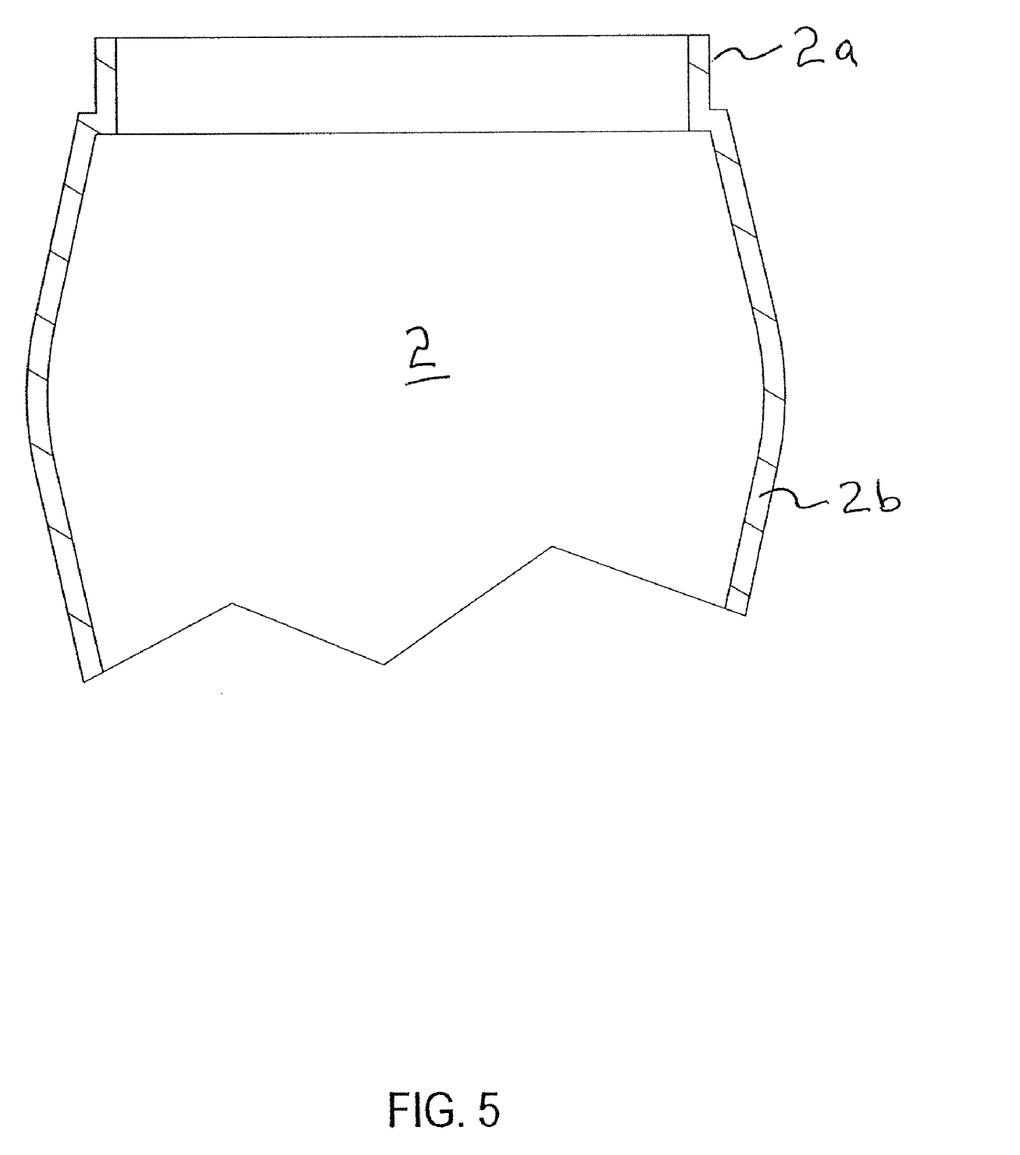
FIG. 5 shows a partial cross-section view of the outer wall used in the embodiment shown in FIG. 1.

The outer wall 2 forms the outside shape of the container 1 and provides an insulation space so as to prevent or limit heat transfer between the inner wall 3 and the outer wall 2. In this regard, the outer wall 2 is preferably generally larger than the inner wall 3. The outer wall 2 also includes a closed bottom, an open top and a generally tapered and/or shaped side wall 2b. Of course, the outer wall 2 can be of any desired shape. By way of non-limiting example, the outer wall 2 can be made of a synthetic resin material such as e.g., PVC. Preferably, the outer wall 2 is generally colorless, substantially transparent or substantially translucent in order to make visible the inner wall 3. The thickness of the wall 2b can be any desired value. Also by way of non-limiting example, the upper portion 2a of the outer wall 2 can be configured with a shoulder in order to accommodate the bent over portion 3c of the inner wall 3. The upper portion 2a of the outer wall 2 can also be sealed to and/or secured (e.g., via an adhesive) to the bent over portion 3c of the inner wall 3 in order to ensure that the substance does not leak into the space between the outer wall 2 and the inner wall 3.

Figure 7:
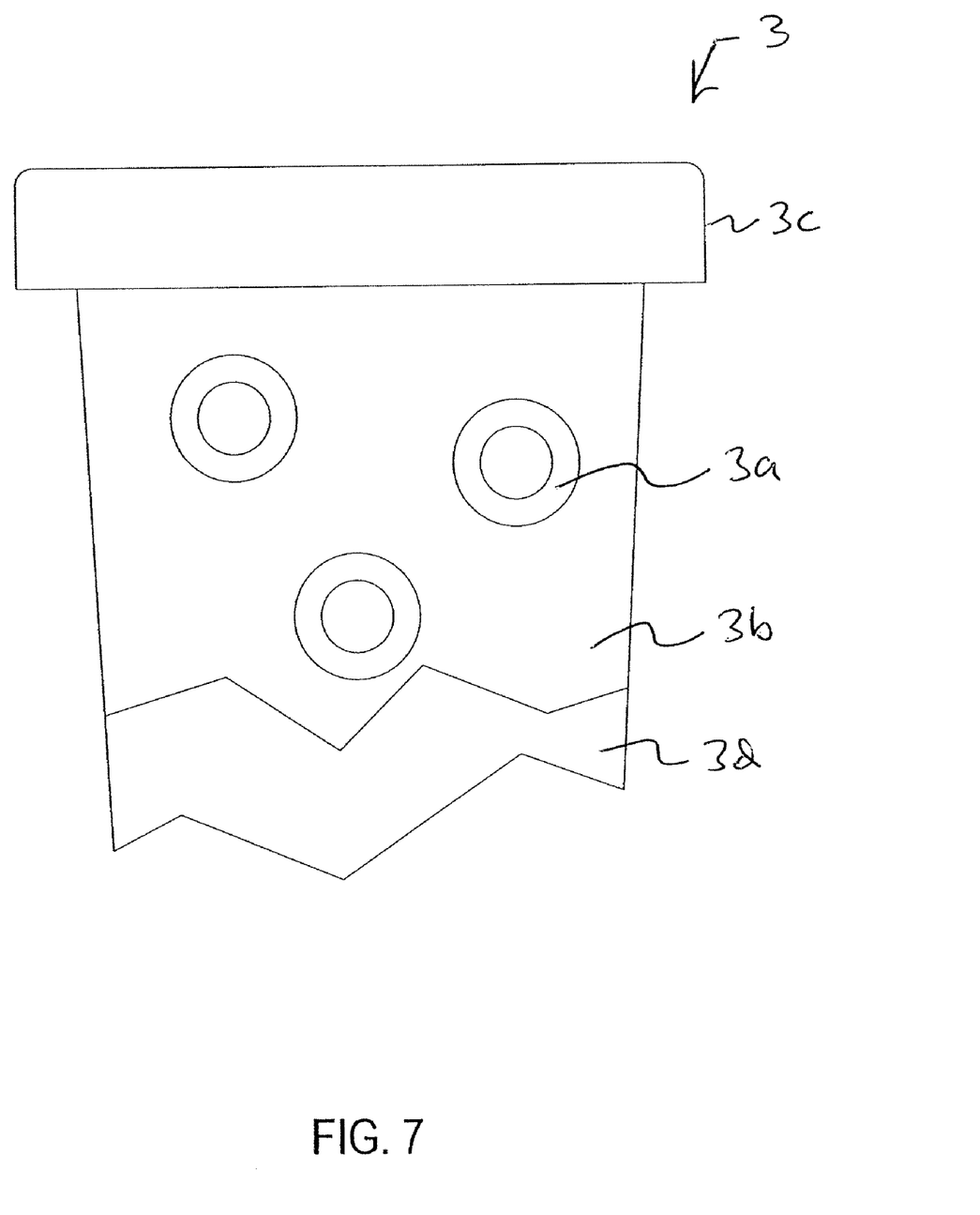
FIG. 7 shows a partial view of the inner wall used in the embodiment shown in FIG. 1 and illustrates the outer surface of the inner wall having the thermochromatic coating. The symbols are clearly visible because the coating has undergone a temperature activated color change.

With reference to FIG. 7, the inner wall 3 has an outer surface upon which one or more symbols 3a can be arranged. A thermochromatic composition layer or coating is also disposed on the outer surface of the inner wall 3. The details of the symbols 3a and the thermochromatic composition with be described later on.

Figure 9:
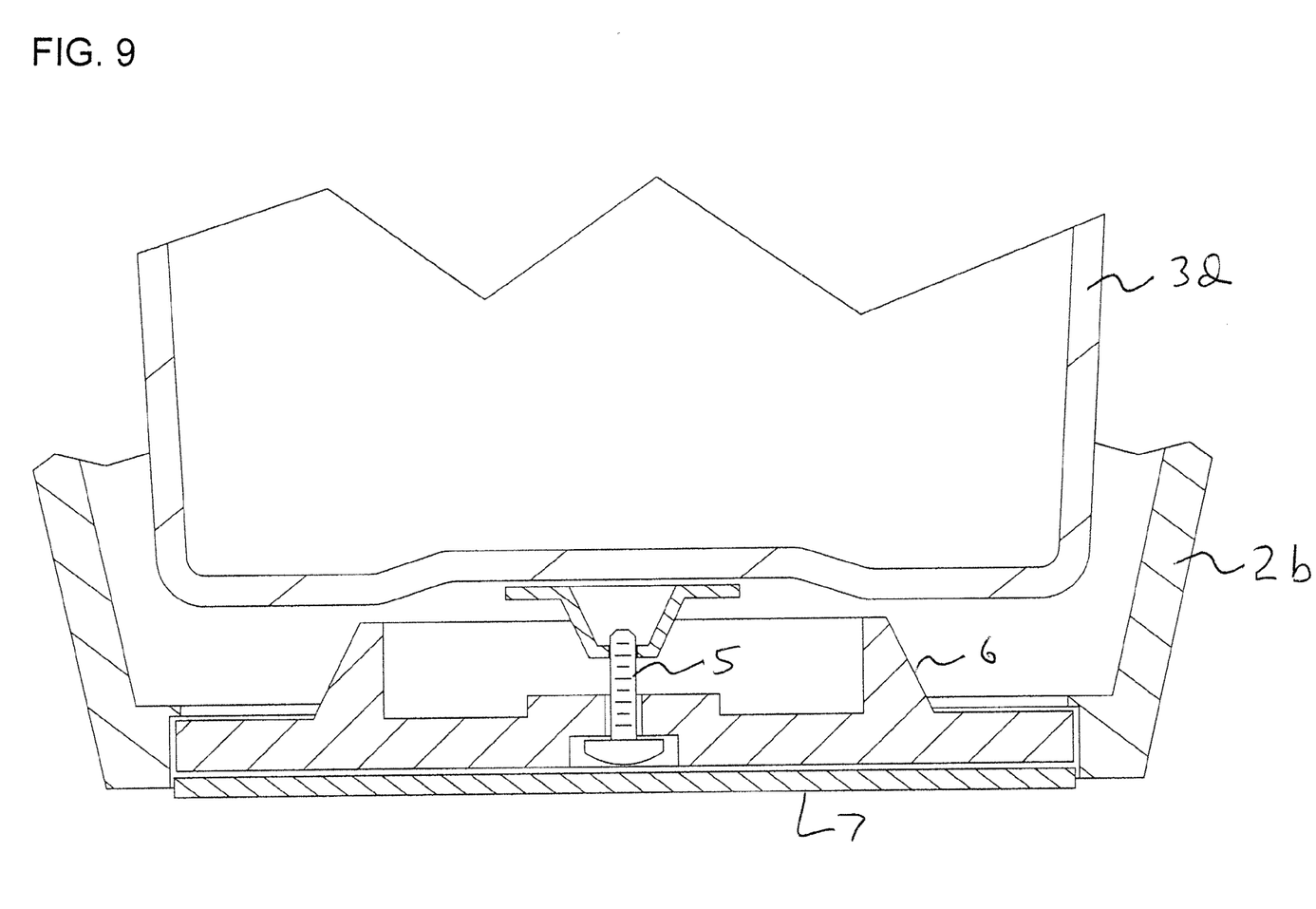
FIG. 9 shows a partial cross-section view of one non-limiting way in which the bottom of the inner wall can be connected to a bottom of the outer wall.
Figure 10:
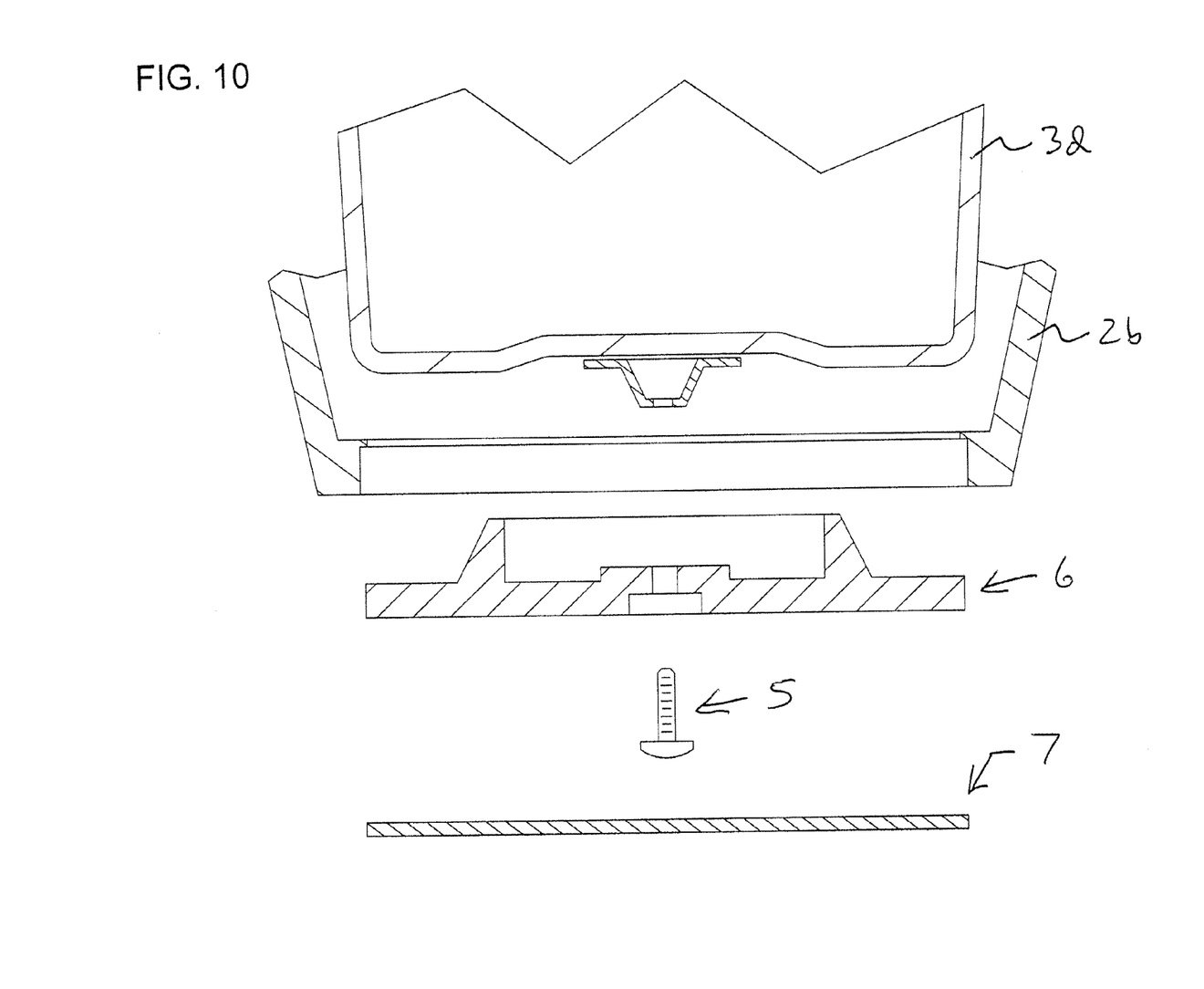
FIG. 10 shows an exploded view of FIG. 9.

FIGS. 8-10 show one non-limiting way in which the inner wall 3 can be connected to the outer wall 2. According to this embodiment, the bottom of the inner wall 3 includes a support member 3e which is secured to the bottom wall. By way of non-limiting example, the support member 3e is made of a metal such as e.g., 18-8 stainless steel. The support member 3e has a generally planar circular base which is secured to the bottom of the inner wall 3 via e.g., spot welding. Of course, it can also be fastened in other ways such as e.g., adhesive bonding. The opposite end of the member 3e includes an internally threaded opening which is sized to threadably engage the threads of a fastener 5, e.g., a screw. The screw 5 can preferably be made of a metal such as e.g., chrome plated steel. In order to secure the outer wall 2 to the inner wall 3, a bottom connecting member 6 is utilized. The member 6 can be generally circular and has an outer perimeter which is sized to seat within a shoulder in the bottom of the outer wall 2. A centrally disposed through opening and a counterbore in the member 6 allows the screw 5 be seated in the member 6 and pass therethrough so as to threadably engage with member 3e. By way of non-limiting example, the member 6 is made of synthetic resin, e.g., clear PVC, and is secured to the bottom of the outer wall 2 via e.g., adhesive bonding. In order to provide the bottom of the container 1 with a friction surface and/or a soft surface (i.e., a surface that is unlikely to scratch a table top), the bottom of the container 1 can be provided with a friction/cushion layer 7. By way of non-limiting example, the layer 7 can be made of a disk-shaped rubber or silicone material and can be secured to the member 6 via e.g., an adhesive.

Figure 11:
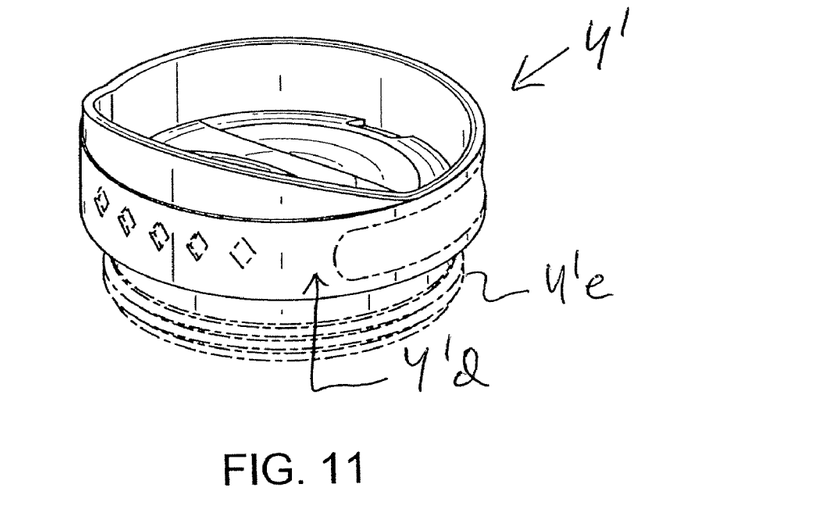
FIG. 11 shows a front perspective view of one non-limiting embodiment of a cap which can be used on the embodiment of FIG. 1.
Figure 12:
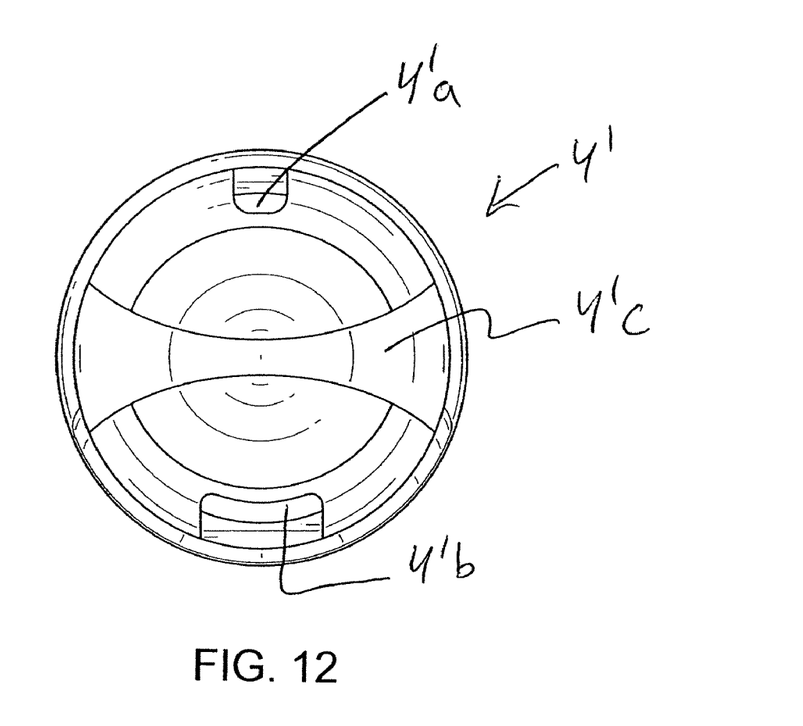
FIG. 12 shows a top view of the cap shown in FIG. 11.

FIGS. 11 and 12 show one non-limiting embodiment of a cap 4' which can be used on the embodiment of FIG. 1. The cap 4' can be a synthetic resin member and can preferably be made of a substantially transparent and/or substantially translucent material, e.g., clear PVC. The cap 4' includes a drink opening 4'b and a vent opening 4'a. In order to close-off and open these openings 4'a and 4'b, the cap 4' also includes a rotatable member 4'c which can be gripped by a user and rotated between the open and closed positions through a rotational angle of e.g., approximately 45 degrees. In order to sealingly removably secure the cap 4' to the container 1, the cap 4' further includes a sealing ring arrangement 4'e. By way of non-limiting example, the sealing ring arrangement 4'e can be made of e.g., silicone.

Figure 13:
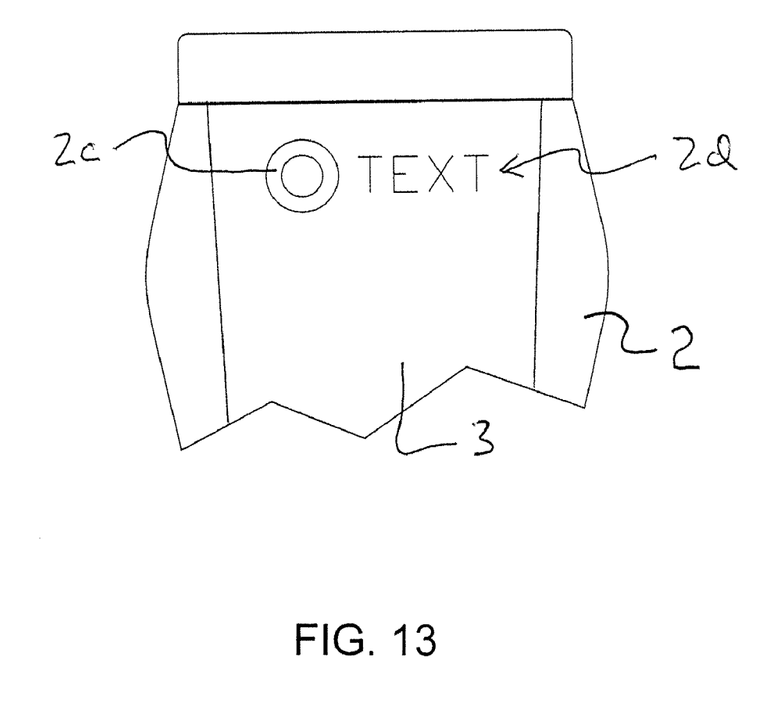
FIG. 13 shows a partial view of another embodiment of the dual-wall container. This embodiment utilizes a symbol and text on the outer wall. The symbol of the outer wall provides an indication of the symbols which will become visible when the inner wall experiences a significant temperature change.
Figure 14:
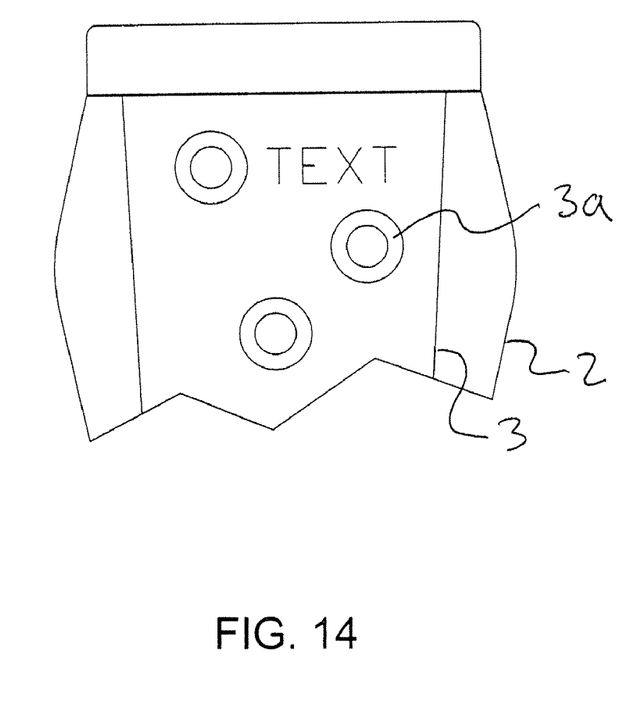
FIG. 14 shows a similar view of the embodiment of FIG. 13 after the inner wall experiences a significant temperature change, i.e., the previously non-visible or hardly visible symbols on the inner wall have now become visible.

FIGS. 13 and 14 show partial views of another embodiment of the dual-wall container. This embodiment is similar to the embodiment of FIG. 1 and further utilizes one or more symbols 2c and/or one or more portions of text 2d on the outer wall 2. The symbol 2c and/or the text 2d of the outer wall 2 provides an indication (i.e., a foreshadowing) of the type of symbols 3a which will become visible when the inner wall 3 experiences a significant temperature change. In FIG. 13, the symbols 3a are barely visible because the inner wall 3 has not experienced a significant temperature change. Such a temperature change can occur when a user, for example, pours into the container a hot liquid. FIG. 14 shows the container of FIG. 13 after the inner wall 3 experiences a significant temperature change, i.e., the previously non-visible or hardly visible symbols 3a on the inner wall 3 have now become visible through the outer wall 2.

The operation of the invention and the various non-limiting ways in which the invention can be made will now be described in detail. With reference again to FIGS. 1-8, the dual-wall container 1 includes an outer wall 2 that is either at least partially substantially transparent or at least partially substantially translucent. The inner wall 3 is sized and adapted to contain a substance such as a liquid which can be consumed by a user. One or more symbols 3a are arranged an outer surface 3d of the inner wall 3. According to one non-limiting embodiment, a coating 3b of a thermochromatic composition is arranged on substantially all of the outer surface 3d of the inner wall 3 (see FIG. 7), i.e., covering both the symbols 3a and the outer surface 3d not covered by the symbols 3a. Accordingly to another non-limiting embodiment, a thermochromatic composition layer 3b is arranged on substantially all of the outer surface 3d of the inner wall 3. According to still another embodiment, a thermochromatic composition 3b is merely applied to or arranged over an outer surface of the symbols 3a. As explained above, the thermochromatic composition covering the symbols 3a and/or the outer surface 3d is structured and arranged to change color when the inner wall 3 experiences or senses a temperature change.

The substance which will activate the color changing effect of the container 1 will typically be a liquid having a temperature significantly above room temperature. The invention also contemplates using a thermochromatic composition which changes color upon sensing a temperature significantly below room temperature. Hot substances can included, e.g., tea, coffee, hot cocoa, etc. Cold substances can include, e.g., cold water and substances which are cooled by ice or freezing. When the inner wall 3 experiences or senses a temperature change, i.e., a hot substance is poured into the container 1, the thermochromatic composition will become substantially colorless, substantially transparent, or substantially translucent. When this occurs, a contrast between the symbols 3a and the inner wall 3 increases thereby rendering the symbols 3a substantially more visible through the transparent outer wall 2.

The symbols 3a can of course be of any desired type and color and can be, e.g., a depiction of an object, one or more geometric shapes, one or more trademarks, one or more numbers, one or more letters, etc. Accordingly to one non-limiting embodiment, the symbols 3a can be printed directly on the outer surface 3d of the inner wall 3 using, e.g., conventional inks. Then, substantially the entire outer surface 3d of the inner wall 3 can be covered with a thermochromatic composition. Alternatively, the symbols 3a can be printed on a clear film, e.g., made of clear PVC. The film can then either be position on the outer surface 3d of the inner wall 3 or attached to the outer surface 3d of the inner wall 3. According to another non-limiting embodiment, the symbols 3a are printed on a first liner, e.g., made of clear PVC, the thermochromatic composition is formed on a second liner, e.g., made of clear PVC, and then the second liner is arranged over the first liner. This two film liner can then be slid onto and/or attached to the outer surface 3d of the inner wall 3. According to still another embodiment, the symbols 3a can be printed, e.g., using conventional inks, on the outer surface 3d of the inner wall 3 and the thermochromatic composition can be printed only on or over the symbols 3a. According to still another embodiment, the symbols 3a can be in the form of self-adhesive imprinted labels which are attached to the outer surface 3d of the inner wall 3. According to still another embodiment, the symbols 3a can be in the form of self-adhesive imprinted labels which are imprinted with a thermochromatic composition and then attached to the outer surface 3d of the inner wall 3. The symbols 3a can also have the form of water decals that are positioned on the outer surface 3d of the inner wall 3.

Thermochromatic compositions of the type which can be utilized in the instant invention, and their properties, are described in an article entitled *Chromatic Properties of Thermochromatic Ink*, by L. JOHANSSON, the disclosure of which is hereby expressly incorporated by reference in its entirety. By way of non-limiting example, the thermochromatic composition can be a chromicolor ink made by Matsui International. The ink can also be of the type disclosed in U.S. Pat. No. 6,863,720 to KITAGAWA et al. and U.S. Pat. No. 6,008,269 to KITAGAWA et al., the disclosures of which are hereby expressly incorporated by reference in their entireties. The thermochromatic composition can also be a thermochromatic ink made by LCR Hallcrest. Of course, other thermochromatic compositions/inks, whether conventional or otherwise, can also be utilized. By way of non-limiting example, the thermochromatic composition can be applied by silkscreening printing. As explained above, the thermochromatic composition can be applied over only the symbols 3a or over substantially all of the outer surface 3d. The thickness of the thermochromatic composition can be any desired value.

According to one non-limiting embodiment, the symbols 3a can be a lighter blue-gray color and are printed with conventional inks on the outer surface 3d. Then, the thermochromatic composition, which can be a dark blue-gray color, is applied to the outer surface 3d (and over the symbols 3a) by silkscreening. When the thermochromatic composition is placed over the symbols 3a, the symbols 3a become difficult to visualize. However, when the inner wall 3 experiences a temperature change, e.g., by heating significantly above room temperature, the blue-gray thermochromatic composition becomes substantially colorless thereby allowing the symbols 3a to become easily seen.

One non-limiting way of making the dual-wall container 1 includes forming the outer wall 2 of either substantially transparent or substantially translucent material. Separately, forming the inner wall 3. Placing, forming or printing the symbols 3a on the outer surface 3d of the inner wall 3. Next, a coating of a thermochromatic composition, e.g., using a silkscreening printing process, is applied on the outer surface 3d or only over the symbols 3a (or both). The inner wall 3 is then placed into the outer wall 2 and secured thereto (see e.g., FIGS. 4 and 9).

The invention also provides for a method of using the dual-wall container 1 of the type described above. The method includes placing a sufficient amount of a substance, e.g., a heated substance, in the dual-wall container 1 in order to cause the thermochromatic composition to change color and thereby render the symbols 3a significantly more visible through the outer wall 2 than prior to pouring in the substance.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A dual-wall container comprising:
   an outer wall that is at least one of:
      at least partially substantially transparent; and
      at least partially substantially translucent;
   an inner wall adapted to contain a substance;
   at least one symbol arranged on an outer surface of the inner wall;
   at least one other symbol arranged on a surface of the outer wall that provides an indication or foreshadowing of the type of symbol arranged on the outer surface of the inner wall which will become visible when the inner wall experiences or senses a temperature change; and
   at least one of:
      a coating of a thermochromatic composition arranged directly on the outer surface of the inner wall;
      a thermochromatic composition layer arranged directly on the outer surface of the inner wall; and
      a thermochromatic composition arranged directly on an outer surface of at least the at least one symbol.

2. The container of claim 1, wherein the substance is a liquid having a temperature above ambient or room temperature, the inner wall comprises stainless steel, and the outer wall comprises synthetic resin.

3. The container of claim 1, wherein the substance is a liquid having a temperature below ambient or room temperature.

4. The container of claim 1, wherein, when the inner wall experiences or senses a temperature change, the thermochromatic composition becomes at least one of substantially colorless, substantially transparent, and substantially translucent.

5. The container of claim 1, wherein, when the inner wall experiences or senses a temperature change, a contrast between the at least one symbol and the inner wall increases thereby rendering the at least one symbol substantially more visible through the outer wall.

6. The container of claim 1, further comprising one of:
   the outer wall comprises a synthetic resin and the inner wall comprises a metal;
   the outer wall comprises a synthetic resin and the inner wall comprises a synthetic resin;
   the outer wall comprises a synthetic resin and the inner wall comprises stainless steel; and
   the outer wall comprises PVC and the inner wall comprises 18-8 stainless steel.

7. The container of claim 1, further comprising a cap arranged to cover an opening of the dual-wall container.

8. The container of claim 1, wherein the at least one symbol comprises at least one of a depiction of an object, one or more geometric shapes, one or more trademarks, one or more numbers, and one or more letters.

9. The container of claim 1, wherein the at least one symbol is printed on the outer surface of the inner wall.

10. The container of claim 1, wherein the at least one symbol is printed on a clear film and the film is at least one of position on the outer surface of the inner wall and secured to the outer surface of the inner wall.

11. The container of claim 1, wherein the at least one symbol is printed on the outer surface of the inner wall and the thermochromatic composition is printed on the at least one symbol.

12. The container of claim 1, wherein the at least one symbol is a self-adhesive imprinted label that is attached to the outer surface of the inner wall.

13. The container of claim 1, wherein the at least one symbol is a water decal that is positioned on the outer surface of the inner wall.

14. The container of claim 1, wherein the thermochromatic composition comprises one of a chromicolor ink and a thermochromatic ink.

15. The container of claim 1, wherein the thermochromatic composition is applied by silkscreening.

16. The container of claim 1, wherein the thermochromatic composition is at least one of:
   arranged to cover the at least a portion of the at least one symbol; and
   applied over at least a portion of the at least one symbol.

17. The container of claim 1, wherein the thermochromatic composition is at least one of:
   arranged to cover the at least one symbol and substantially all of the outer surface of the inner wall; and
   applied over the at least one symbol and substantially all of the outer surface of the inner wall.

18. A method of making a dual-wall container comprising an outer wall that is at least one of at least partially substantially transparent and at least partially substantially translucent, an inner wall adapted to contain a substance, at least one symbol arranged an outer surface of the inner wall, the method comprising;
   arranging the at least one symbol on the outer surface of the inner wall;
   arranging an other symbol on a surface positioned over the outer surface of the inner wall, the other symbol providing an indication or foreshadowing of the type of symbol arranged on the outer surface of the inner wall which will become visible when the inner wall experiences or senses a temperature change; and
   at least one of:
      applying a coating of a thermochromatic composition directly on the outer surface of the inner wall; and
      arranging a thermochromatic composition layer directly on the outer surface of the inner wall.

19. The method of claim 18, wherein the at least one symbol comprises at least one of a depiction of an object, one or more geometric shapes, one or more trademarks, one or more numbers, and one or more letters.

20. The method of claim 18, wherein the arranging the at least one symbol comprises printing the at least one symbol on the outer surface of the inner wall.

21. The method of claim 18, wherein the arranging the at least one symbol comprises printing the at least one symbol on a clear film and further comprising at least one of positioning the film on the outer surface of the inner wall and securing the film to the outer surface of the inner wall.

22. The method of claim 18, wherein the arranging the at least one symbol comprises printing the at least one symbol on the outer surface of the inner wall and wherein the thermochromatic composition is printed on the at least one symbol.

23. The method of claim 18, wherein the at least one symbol is a self-adhesive imprinted label and wherein the placing comprises attaching the self-adhesive imprinted label to the outer surface of the inner wall.

24. The method of claim 18, wherein the at least one symbol is a water decal and wherein the placing comprises positioned the water decal on the outer surface of the inner wall.

25. The method of claim 18, wherein the arranging the at least one symbol comprises one of:
   printing the at least one symbol on the outer surface of the inner wall; and printing the at least one symbol with a non-thermochromatic ink on the outer surface of the inner wall.

26. The method of claim 18, wherein the thermochromatic composition comprises one of a chromicolor ink and a thermochromatic ink.

27. The method of claim 18, wherein the thermochromatic composition is applied by silkscreening.

28. The method of claim 18, wherein the thermochromatic composition is at least one of:
   arranged to cover at least a portion of the at least one symbol; and
   applied over at least a portion of the at least one symbol.

29. The method of claim 18, wherein the thermochromatic composition is at least one of:
   covering the at least one symbol and substantially all of the outer surface of the inner wall; and
   applied over the at least one symbol and substantially all of the outer surface of the inner wall.

30. The method of claim 18, wherein the thermochromatic composition is applied only over the at least one symbol.

31. A dual-wall container comprising:
   a synthetic resin outer wall that is at least one of:
      at least partially substantially transparent; and
      at least partially substantially translucent;
   a stainless steel inner wall adapted to contain a substance;
   at least one symbol arranged directly on an outer surface of the inner wall;
   at least one other symbol arranged on a surface spaced from and positioned over the outer surface of the inner wall, the at least one other symbol providing an indication or foreshadowing of the type of symbol arranged on the outer surface of the inner wall which will become visible when the inner wall experiences or senses a temperature change; and
   at least one of:
      a coating of a thermochromatic composition arranged on the outer surface of the inner wall;
      a thermochromatic composition layer arranged directly on the outer surface of the inner wall; and
      a thermochromatic composition arranged directly on an outer surface of at least the at least one symbol,
   wherein the thermochromatic composition is one of activatable when the inner wall experiences or senses a temperature change and structured and arranged to change color when the inner wall experiences or senses a temperature change.

32. The container of claim 31, wherein the at least one other symbol is arranged on the outer wall, and wherein the other symbol is substantially similar to the at least one symbol.

33. A method of using the dual-wall container of claim 31, the method comprising:
   placing a sufficient amount of the substance in the dual-wall container in order to cause the thermochromatic composition to change color and thereby one of:
      render the at least one symbol significantly more visible through the outer wall than prior to the placing;
      change a color of the outer surface of the inner wall not covered by the at least one symbol so that the at least one symbol visually stands out more relative to the outer surface of the inner wall; and
      increase a color contrast between the outer surface of the inner wall not covered by the at least one symbol and the at least one symbol,
   wherein the substance comprises a temperature that is one of above room temperature and below room temperature.

34. A dual-wall container comprising:
   an outer wall that is at least one of:
      at least partially substantially transparent; and
      at least partially substantially translucent;
   at least one symbol arranged on an outer surface of the outer wall;
   an inner wall adapted to contain a substance;
   at least one symbol arranged on an outer surface of the inner wall; and
   at least one of:
      a coating of a thermochromatic composition arranged on the outer surface of the inner wall and over the at least one symbol;
      a thermochromatic composition layer arranged on the outer surface of the inner wall and over the at least one symbol; and
      a thermochromatic composition arranged on an outer surface of at least the at least one symbol and over the at least one symbol,
   wherein the at least one symbol arranged the outer surface of the outer wall provides an indication or foreshadowing of the type of symbol arranged on the outer surface of the inner wall which will become visible when the inner wall experiences or senses a temperature change, and
   wherein the thermochromatic composition is one of activatable when the inner wall experiences or senses a temperature change and structured and arranged to change color when the inner wall experiences or senses a temperature change.

* * * * *